(12) United States Patent
Iseli

(10) Patent No.: US 6,600,112 B2
(45) Date of Patent: Jul. 29, 2003

(54) WEIGHING SCALE WITH A COMBINED SEALING AND ARRESTING DEVICE

(75) Inventor: Marc Iseli, Bäretswil (CH)

(73) Assignee: Mettler-Toledo GmbH, Greifensee (CH)

(*) Notice: Subject to any disclaimer, the term of this patent is extended or adjusted under 35 U.S.C. 154(b) by 84 days.

(21) Appl. No.: 09/821,491

(22) Filed: Mar. 29, 2001

(65) Prior Publication Data
US 2001/0027882 A1 Oct. 11, 2001

(30) Foreign Application Priority Data
Apr. 10, 2000 (DE) ............................ 100 17 528

(51) Int. Cl.[7] .............................................. G01G 23/02
(52) U.S. Cl. ........................................ 177/154; 177/156
(58) Field of Search ................................. 177/146, 154, 177/155, 156, 157, 158, 159, 124, 126, 184, 187, 189, 208, 209, 254

(56) References Cited

U.S. PATENT DOCUMENTS

| 3,217,818 A | * 11/1965 | Engelsher et al. ........... 177/208 |
| 3,456,749 A | * 7/1969 | Smieja ......................... 177/146 |
| 3,587,760 A | * 6/1971 | Linz et al. .................... 177/146 |
| RE27,234 E | * 11/1971 | Smieja ......................... 177/146 |
| 4,137,977 A | * 2/1979 | Alger .......................... 177/146 |
| 4,589,507 A |   5/1986 | Curran ......................... 177/138 |
| 4,673,048 A | * 6/1987 | Curran ......................... 177/146 |
| 5,703,334 A | * 12/1997 | Hansson et al. ............ 177/184 |
| 5,789,714 A | * 8/1998 | Doerksen ..................... 177/146 |

FOREIGN PATENT DOCUMENTS

| EP | 0197982 | 10/1986 |
| EP | 0572181 | 12/1993 |

* cited by examiner

Primary Examiner—Randy Gibson
(74) Attorney, Agent, or Firm—Friedrich Kueffner

(57) ABSTRACT

A weighing scale has a housing (1) that encloses a force transducer (4). A load-transmitting member (9) is connected to the force transducer (4) and passes through an opening to the outside of the housing to transmit the weighing load to the force transducer. An elastic device is interposed between a fixed part that is attached to the housing (1) and a movable part that is attached to the load-transmitting member (9). The elastic device is preferably hollow and controllably expandable and contractible by injecting and removing a fluid through a conduit system (31–43) with a selectively switchable valve device.

18 Claims, 2 Drawing Sheets

WEIGHING SCALE WITH A COMBINED SEALING AND ARRESTING DEVICE

BACKGROUND OF THE INVENTION

The invention relates to a weighing scale (hereinafter called a scale, for short) in the general sense of a weighing device with a housing. Inside the housing is a force transducer, and connected to the latter is a load-transmitting member that passes through an opening in the housing and serves to transmit the weighing load to the force transducer. With scales of this type, the following two concerns need to be addressed: First, when the scale is not in use, it may be desirable to immobilize the movable parts inside the scale with an arrestment device for protection against random forces that could be detrimental to the accuracy of the scale. Second, it is a known fact that scales are often used in a dirty environment and that, furthermore, the materials themselves that are being weighed can contaminate a scale and thereby cause its accuracy to deteriorate. Many applications require that the process of applying and releasing the arrestment can be performed in rapidly alternating succession.

OBJECT OF THE INVENTION

It is therefore the objective of the present invention to further develop a scale of the type described above by providing arrestment and sealing means that can be alternated rapidly between the applied and released state and are effective in preserving the accuracy of the scale in the presence of the aforementioned conditions.

SUMMARY OF THE INVENTION

According to the invention, the objective just stated is met by an arrangement where a controllably expandable and contractible elastic device is interposed between a first, spatially fixed part and a second, movable part of the scale. The fixed part is connected to the scale housing, while the movable part is connected to the load-transmitting member. Thus, when a load is applied to the load-transmitting member, the movable part will be displaced in relation to the fixed part. In the expanded state, the elastic device closes a gap between the fixed and movable part, whereby the gap is sealed and the movable part is immobilized, i.e., arrested in relation to the fixed part. The elastic device can be configured so that its deactivated rest mode corresponds to the expanded state of the device, where the movable part of the scale is arrested. In this case, the device will contract when activated, whereby the arrestment of the movable part is released. As an alternative possibility, the device can be configured so that its deactivated rest mode corresponds to the contracted state of the device, where the movable part is in a released condition, while activating the device will cause the latter to expand, whereby the movable part is arrested. In addition to immobilizing the second part, the arrestment in either case will to a certain extent have the effect of a seal between the movable part and the spatially fixed part that is connected to the scale housing.

A solution of this kind is of twofold benefit: On the one hand, the concept of expanding and contracting an elastic device, which could be a spring, allows the movable part to be arrested against the fixed part either by a form-fitting engagement (where the elastic device expands into a counterpart of a matching concave shape) or by a friction-based engagement. On the other hand, when the elastic device is in its expanded state, it can also form a seal.

The ability to function as a seal is realized in particular with an arrangement where the elastic device forms a hollow space for a fluid and the expansion and contraction is effected by increasing or decreasing the amount of fluid contained in the hollow space. In practice, this can be achieved by providing a device for selectively moving fluid into and out of the hollow space. This also represents a simple way of activating and deactivating the device.

The sealing function is achieved most efficiently by arranging the elastic device at the place where the load-transmitting member passes through an opening in the scale housing. This has the advantage, that the seal is provided in the immediate area where the functionally required opening in the scale housing is located. It would of course be conceivable to arrange the seal somewhere more in the interior of the scale and to provide a dirt-collecting chamber, but the arrangement of the seal at the periphery of the housing proves to be more advantageous.

Although it would be possible within the scope of the present invention to attach the elastic device to the movable part and to let it expand against the spatially fixed part, the favored arrangement is to connect the elastic device to the spatially fixed part and let it expand against and make contact with the movable part. Preferably also attached to the fixed part is a conduit system for injecting and removing fluid.

Within the context of the invention, it is readily conceivable to configure an elastic arrestment device, e.g., in the form of individual cushions that could be mechanically expandable, for example by pressurizing the cushions. However, the preferred form of the elastic device is a ring-shaped cushion that is interposed between the fixed part and the movable part and in its non-expanded state has a cylindrical surface of predetermined diameter with an axial orientation in the travel direction of the movable part. The ring-shaped cushion can be seated on a support body (represented by a ring-shaped support in the preferred embodiment described below) that fills the inside of the ring-shaped cushion and is preferably connected to a conduit for letting fluid in and out of the cushion.

In order to achieve the largest possible area of pressurized contact between the fixed part and the movable part, it is advantageous if the ring-shaped support has a convex-curved contour shape facing towards the movable part, with a contour radius about equal to the ring diameter of the cushion. The convex surface shape of the cushion produces a particularly effective sealing interface compared, e.g., to a mere line contact between the fixed part and the movable part.

If the expansion of the cushion is based on hydraulic or (preferably) pneumatic pressure, a uniform pressure distribution can be achieved if the ring-shaped support has a ring channel in the shape of a groove facing the interior surface of the ring cushion.

The contact engagement of the elastic device between the fixed part and the movable part creates the danger that the movable part will be exposed to non-symmetric forces that could be harmful or even destructive to the weighing cell. It is therefore advantageous to use a design feature that will allow a certain amount of play in the horizontal directions.

Further details of the invention will be discussed in the following description of a preferred embodiment and a variant version of the preferred embodiment that are schematically represented in the drawings.

DESCRIPTION OF PREFERRED EMBODIMENTS

Figure 1:
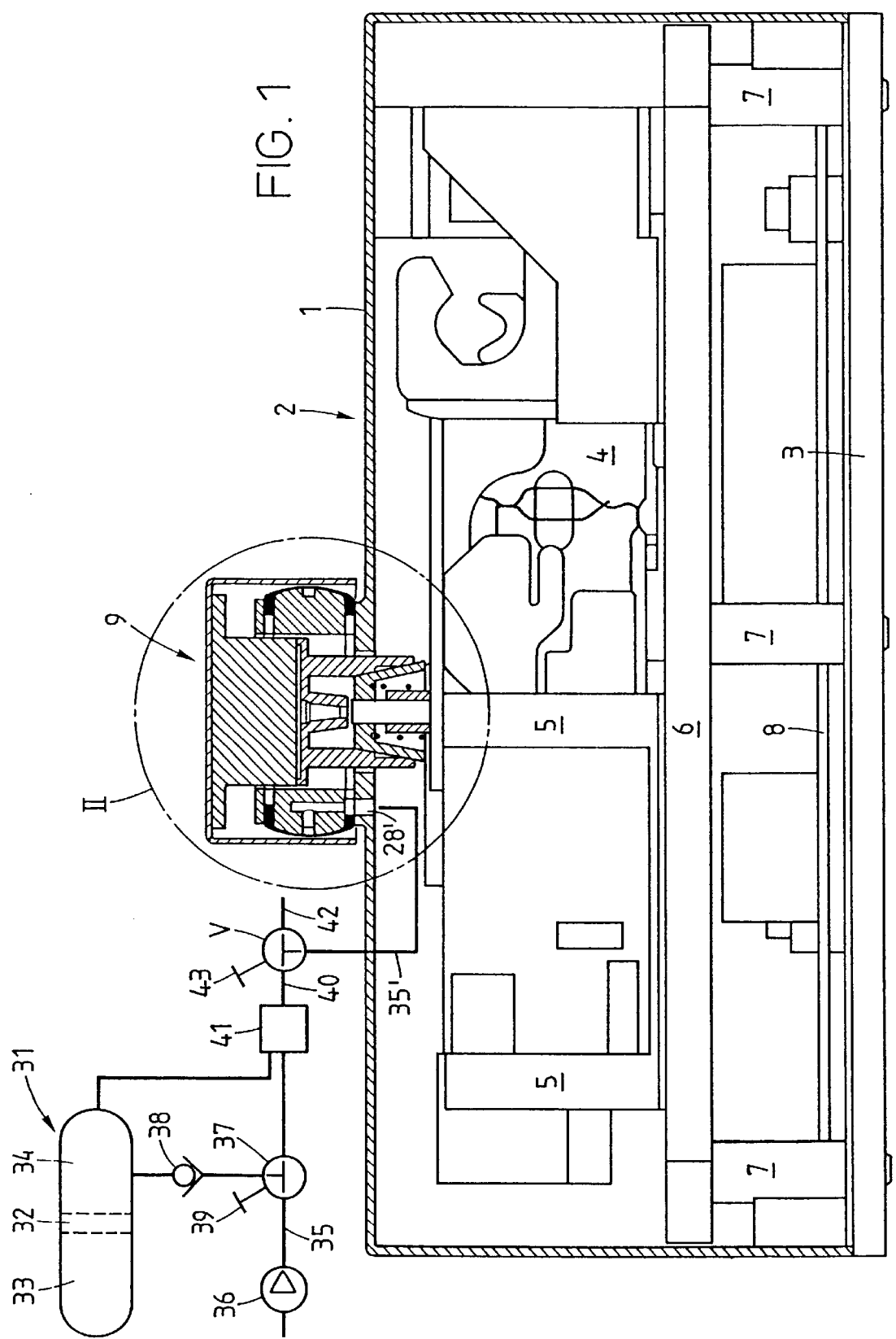
FIG. 1 shows a section through the scale housing of a scale according to the invention.

FIG. 1 gives a schematic view of a scale 2, e.g., a conveyor-belt scale installed below a weighing section of a conveyor belt. The scale housing 1 is seated on a base 3. The scale housing 1 encloses a force transducer 4 of a design that is known per se, preferably of a type where a block containing the lever-reduction mechanism is mounted on a plate 6 by means of brackets 5. The plate 6, in turn, is supported from below on posts 7. The space below the plate 6 is occupied by the electronic circuitry required to perform the weighing process, for example a circuit board module 8.

Figure 2:
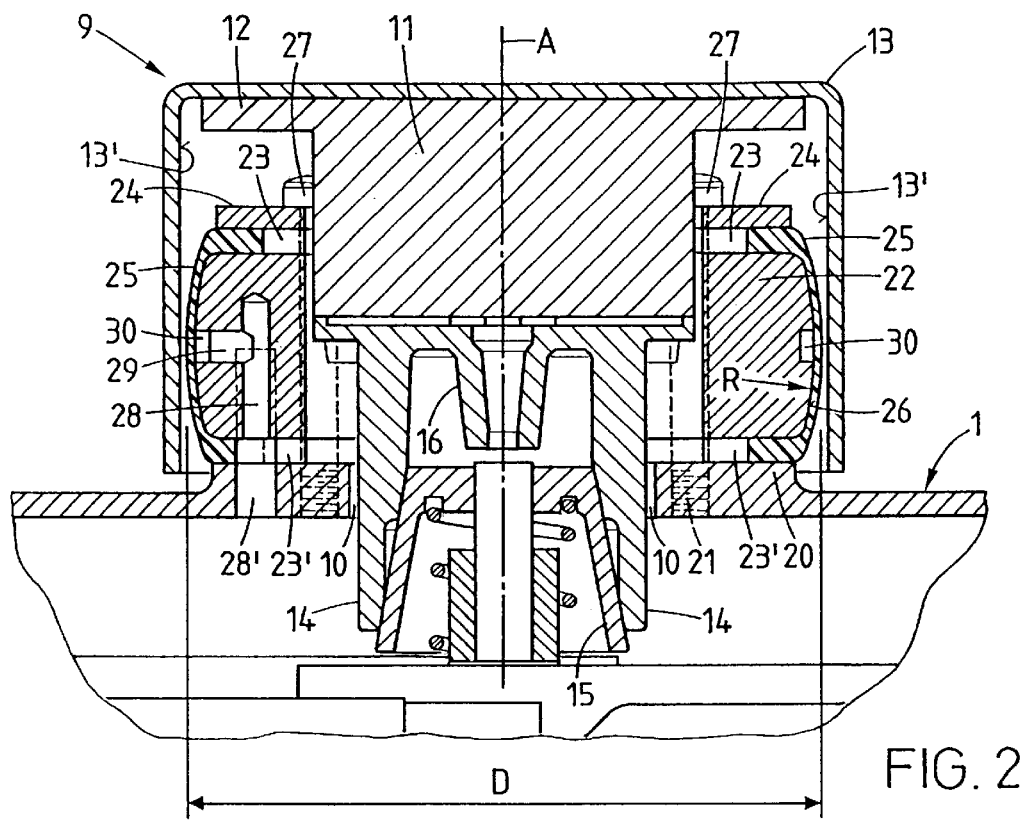
FIG. 2 represents an enlarged view of the detail portion II of FIG. 1.

A load-transmitting member 9, shown in an enlarged view in FIG. 2, protrudes like a large push-button on the topside of the scale housing. The load-transmitting member extends in the direction of an axis A and passes through a coaxial opening 10 of the scale housing 1 to transmit the force from the weighing load to the force transducer 4. Thus, FIG. 2 in particular illustrates that the load-transmitting member 9 has axial mobility inside the opening 10 in relation to the walls of the housing 1.

The load-transmitting member 9 consists of a load button 11 with a widened head portion 12 that may be covered by a substantially cup-shaped cap 13. In its bottom part, the load-transmitting member 9 has connector legs 14 or a single support post with a conical recess which allows the load-transmitting member to be seated in place on, as well as easily removed from, a conical peg 15. The legs 14 are extensions of a hub 16 that is attached to the underside of the load button 11, e.g., by adhesive bonding. The load button 11, the head portion 12, and the hub 16, with the possible inclusion of the legs or support post 14, can also be made of one integral piece of material. The legs or support post 14 serve to conduct the weighing force from the load-transmitting member 9 through the conical peg 15 into the force transducer 4 in a manner consistent with customary scale design.

If the scale is to be arrested, e.g., in a case where a conveyor belt running over the scale is in motion and generates unwanted forces on the load-transmitting member 9, the objective is to immobilize the levers of the force transducer 4. Of course, one could also conceive of an arrestment device acting directly on the levers themselves, analogous to the way in which damping devices are generally designed to act on the lever system itself. However, the arrestment device according to the invention as described herein is preferred because it puts the bearings and pivots of the lever mechanism into a load-free state. The rim of the opening 10 on the topside of the scale housing 1 is shaped as a flange 20 with threaded holes 21. A ring-shaped support 22 is mounted on the flange by means of screw bolts 27 that are engaged in the threaded holes 21.

The ring-shaped support 22 has upper projections 23 and lower projections 23', e.g., in the form of ridges, that serve as spacers to a clamping plate 24 at the top and to the flange 20 at the bottom of the ring-shaped support 22. A cushion-shaped sealing membrane 25, forming a kind of inflatable seal, is clamped at the top between the projections 23 and the clamping plate 24 and at the bottom between the projections 23' and the flange 20.

The sealing membrane 25 is convex, i.e., outward-curved in cross-section, with a contour radius R. The ring-shaped support 22 is preferably designed with a supporting surface 26 contoured approximately parallel to the inside of the sealing membrane 25. The supporting surface 26 forms a rest surface for the sealing membrane 25. The ring diameter of the membrane 25 relative to axis A, is identified by the reference symbol D in FIG. 2.

The ring-shaped support 22 (also referred to as support body 22) has at least one longitudinal bore hole 28 (longitudinal meaning parallel to the ring axis A) and at least one transverse bore hole 29. Preferably, the transverse bore hole 29 is directed immediately towards the equatorial circle of the membrane 25. In an advantageous design arrangement, the transverse bore hole 29 opens into a ring-groove channel 30 running along the equatorial circle of the ring-shaped support or support body 22, so that a fluid supplied through the bore holes 28, 29 can be evenly distributed all around the ring-shaped support.

The longitudinal bore hole 28 of the ring-shaped support 22 is threaded over part of its length. The bore hole 28 is continued in a bore hole 28' of the flange 20, which could likewise be equipped with a screw thread. By means of one or the other of the threads, a fluid conduit 35' (FIG. 1) can be connected to the bore hole 28. Obviously (and therefore not shown), the membrane 25, which is clamped tight between the projections 23' and the flange 20, has an appropriate opening in the line of the bore holes 28, 28'.

The fluid circuit, which is schematically drawn outside the scale housing in FIG. 1, represents only one among many design possibilities. It could also in part or in its entirety be accommodated inside the scale housing 1. The fluid circuit allows two modes in which a fluid, preferably air, can be supplied to the sealing device. The two modes can either be used individually or in the combined way shown in the illustrated example. A pressure accumulator 31, divided into two chambers 33 and 34 by a movable piston 32, serves as the fluid source. The left-hand chamber 33 is air- or gas-tight and is, e.g., filled with a fixed quantity of gas, whereby the air pumped into the chamber 34 is put under a pressure that is substantially constant, i.e., varying within predetermined limits. The air is delivered through a supply conduit 35 that is connected to a pump or bellows 36. The use of an accumulator 31 is advantageous, because the gas cushion in chamber 33 will automatically compensate for possible leakage losses in the membrane 25, even if the scale is not being used over an extended period of time.

As shown in FIG. 1, the supply conduit 35 runs through a switching valve 37, continuing to the chamber 34, preferably by way of a check valve 38. The check valve 38 could, in principle, be located at any place along the supply conduit 35, given that its basic purpose is to prevent the back-flow of pressurized air to the pump 36 and/or to the outside. This purpose also applies when the pump does not have to work against the accumulator pressure but supplies pressure directly to the membrane 25 to cause the latter to expand. However, a pump 36 of the type that may be used in this application will in most cases be equipped with its own check valve, so that an additional check valve may be entirely redundant. On the other hand, one could also arrange a check valve in both of the conduits departing from the switching valve 37.

Alternatively, the switching valve 37 by means of a manual control 39 can be set to a condition where the compressed air delivered from the pump 36 is directed immediately through the conduit 40 to the channel system formed by the bore holes 28, 29 and the ring-groove channel 30. However, while an accumulator 31 can deliver and maintain a relatively even pressure on the membrane 25, connecting the pump 36 directly to the channel system 28, 29, 30 entails the risk that the pressure may run too high. It can therefore be advisable to provide a pressure-limiting valve 41 in the conduit 40 (or at any place between the conduit 40 and the membrane 25), in order to cut off the supply of pressure medium or release the excess medium above a predetermined maximum pressure level.

The introduction of the pressure medium, preferably a pneumatic medium, causes the membrane 25 to expand in the direction of the ring radius and to meet the internal surface 13' of the cup-shaped cap 13 in compressive contact. If the membrane 25 were configured as merely a toroidal elastic hose, a possibility that lies within the scope of the invention, then the area of compressive contact with the internal surface 13' would be reduced to almost no more than a narrow ring line on the internal circumference of the cup-shaped cap 13. By giving the membrane 25 the shape of a relatively wide ring cushion as illustrated and explained, using in particular a contour radius R approximately equal to the ring diameter D, one obtains the benefit of a wide contact surface and thus a snug sealing contact between the membrane 25 and the internal surface 13'. This has a twofold advantage: First, the load-transmitting member 9 is immobilized by the compressive frictional contact. This fulfills the purpose of arresting the scale, which is desirable during periods when the scale is not in use. Second, the tight contact prevents dust or other forms of contamination from entering through the opening 10 into the interior of the scale housing 1. Even the cup-shaped cap 13 by itself has a significant protective effect (including when the scale is in operation), because contaminating material can enter only by migrating first upwards through the gap between the membrane 25 and the internal surface 13' and then downwards along the inner surface of the ring-shaped support body 22. Thus, the cup-shaped cap 13 forms a kind of labyrinth or dust baffle that is also effective when the scale is in an operating state. Thus, in a fortunate combination, the membrane 25 combines the functions of an arrestment device and of an effective barrier against contamination of the interior of the scale housing 1. To avoid subjecting the force transducer 4 to radial forces that could be caused by the push of the membrane 25 against the cap 13 and thus against the load-transmitting member 9, the internal diameter of the cup-shaped cap 13 is dimensioned slightly larger than the diameter of the widened head portion 12, so that there is radial play between the cap and the head portion.

Figure 3:
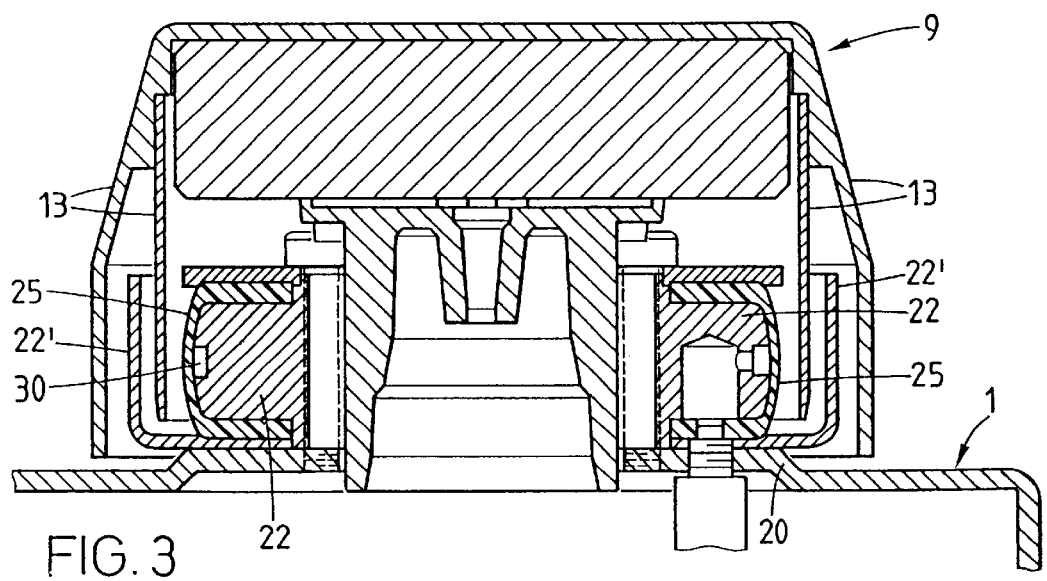
FIG. 3 represents a variant version of the detail portion II.

FIG. 3 illustrates a variant version of the detail II of scale 2 with a further developed labyrinth baffle. The flange 20 is replaced by a raised wall portion of the housing 1 around the load-transmitting member 9. The ring-shaped support 22 is supplemented by a cup 22' extending outwards from the underside of part 22 and surrounding the part 22 at a distance. The cup-shaped cap 13 in FIG. 3 has two concentric walls with the wall of the cup 22' rising up between them. The labyrinth baffle formed by the two concentric walls and the cup 22' provides a high degree of protection against the entry of contaminating particles.

To return a scale to an operative state after it has been arrested by expanding the elastic element requires primarily a reversal of the expansion of the elastic element, i.e., of the membrane 25. In principle, this could be accomplished by a device that releases the pressure on the clamping plate 24 for a short time interval to allow air to escape from the membrane 25. A better solution is to provide a switchable valve V that allows air to be let off, e.g., by way of an air-outlet conduit 42 that leads to the outside. Of course, an air-outlet conduit for this purpose can be arranged in any number of ways, and FIG. 1 only gives a schematically simplified indication. For example, the air-outlet conduit could be arranged so that it would at the same time serve to blow away dirt that may have accumulated near the load-transmitting member 9.

The switching valve V can be operated by a manually or automatically operated actuator 43, as indicated in FIG. 1. An automatically operated actuator can, e.g., include a switch that is synchronized with the control of a conveyor belt running across the scale 2. With this arrangement, the arrestment can be automatically released at the same time as the scale is turned on, whereby malfunctions are avoided.

Numerous modifications are possible within the scope of the present invention. In particular, an elastic device can be designed so that the scale is at all times in an arrested condition and is only released when activated to perform a weighing. This can be achieved, e.g., if the elastic device has an inactive condition where it maintains contact engagement between the fixed part and the movable part and is contracted prior to performing a weighing process, whereby the fixed part and the movable part are uncoupled from each other. In practical terms, the elastic device can consist, e.g., of a ring-shaped hose that can be made to collapse by evacuating the air from it.

What is claimed is:

1. A weighing scale, comprising a housing with an opening; a force transducer fixed inside the housing; a load-transmitting member connected to the force transducer and extending through the opening, the load-transmitting member serving to transmit a weighing load to the force transducer; a spatially fixed part connected to the housing; a movable part connected to the load-transmitting member, wherein the movable part is movable in response to a weighing load in relation to the housing; and a controllably expandable and contractible elastic device is interposed between the fixed part and the movable part to engage and release a surface contact between the fixed part and the movable part.

2. The weighing scale of claim 1, wherein the elastic device has a rest condition corresponding to an engaged state between the fixed part and the movable part, and the movable part is released by contracting the elastic device.

3. The weighing scale of claim 1, wherein the elastic device has a rest condition corresponding to a released state between the fixed part and the movable part, and the movable part is immobilized by expanding the elastic device.

4. The weighing scale of claim 3, wherein the elastic device is connected to the fixed part and is expandable towards the movable part to establish the surface-contact engagement.

5. The weighing scale of claim 1, wherein the fixed part is an outward-projecting part of the housing and the movable part is a portion of the load-transmitting member protruding through the opening.

6. The weighing scale of claim 5, wherein the load-transmitting member comprises a substantially cup-shaped cap extending over and surrounding the fixed part, and the elastic device is interposed between the fixed part and an inside wall surface of the cap.

7. The weighing scale of claim 1, wherein the elastic device comprises a ring-shaped cushion arranged coaxially with the movable part, said cushion has a predetermined ring diameter D, and a cross-section of the ring-shaped cushion has a peripheral contour radius R when the cushion is in a rest condition.

8. The weighing scale of claim 7, wherein the contour radius R is at least approximately equal to the ring diameter D.

9. The weighing scale of claim 1, further comprising a fluid circuit; wherein the elastic device comprises a hollow space and is expanded by letting pressurized fluid into the hollow space, the elastic device is contracted by letting fluid out of the hollow space, and the fluid is let in and out through the fluid circuit, the latter being selectively switchable between letting fluid in and out.

10. The weighing scale of claim 9, wherein the fluid is air.

11. The weighing scale of claim 9, wherein the fluid circuit comprises a hand pump.

12. The weighing scale of claim 9, wherein the fluid circuit comprises an accumulator.

13. The weighing scale of claim 9, wherein the fluid circuit comprises a pressure-limiting valve.

14. The weighing scale of claim 9, wherein the fluid circuit comprises a switching valve with an actuator device to operate the switching valve.

15. The weighing scale of claim 9, wherein the fluid circuit comprises at least one supply conduit with a check valve.

16. The weighing scale of claim 7, wherein the fixed part comprises a ring-shaped support disposed inside the ring cushion, and the ring-shaped support comprises at least one channel through which fluid is supplied to and removed from the ring cushion.

17. The weighing scale of claim 16, wherein the ring-shaped support has an outward-facing support surface with a convex contour towards an inward-facing surface of the movable part, the convex contour having a curvature radius approximately equal to the contour radius R of the ring cushion.

18. The weighing scale of claim 16, wherein the ring-shaped support has a ring-groove channel facing towards the ring cushion.

* * * * *